United States Patent Office 3,136,338
Patented June 9, 1964

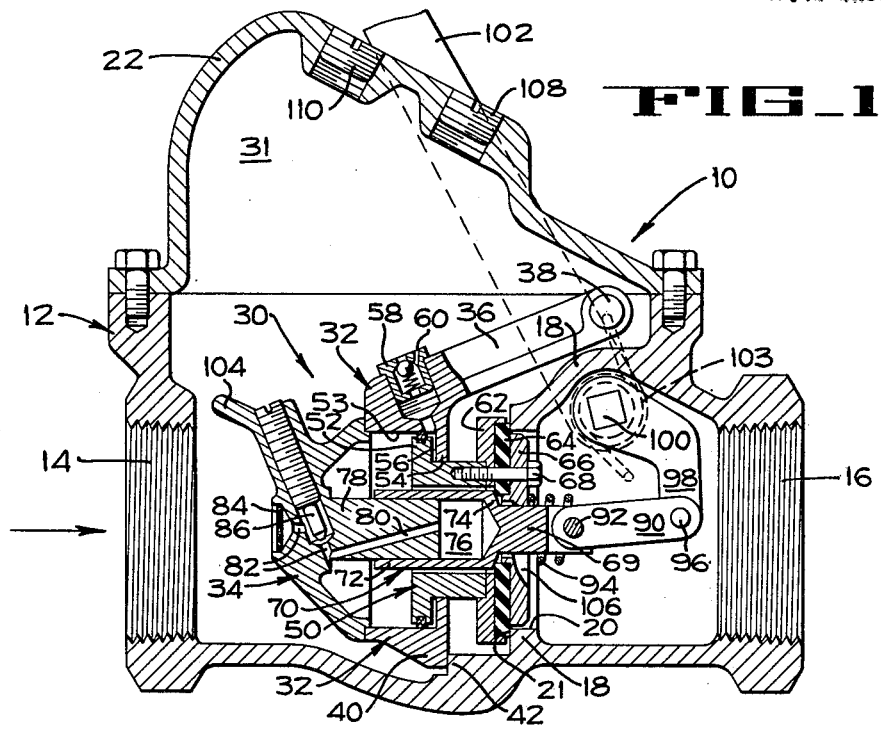

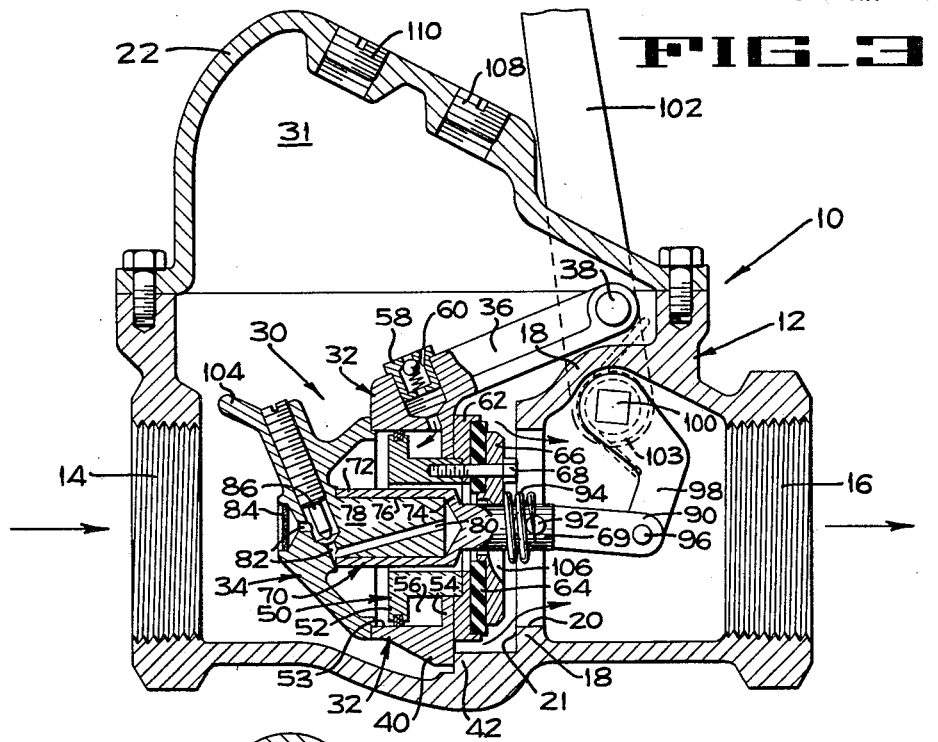
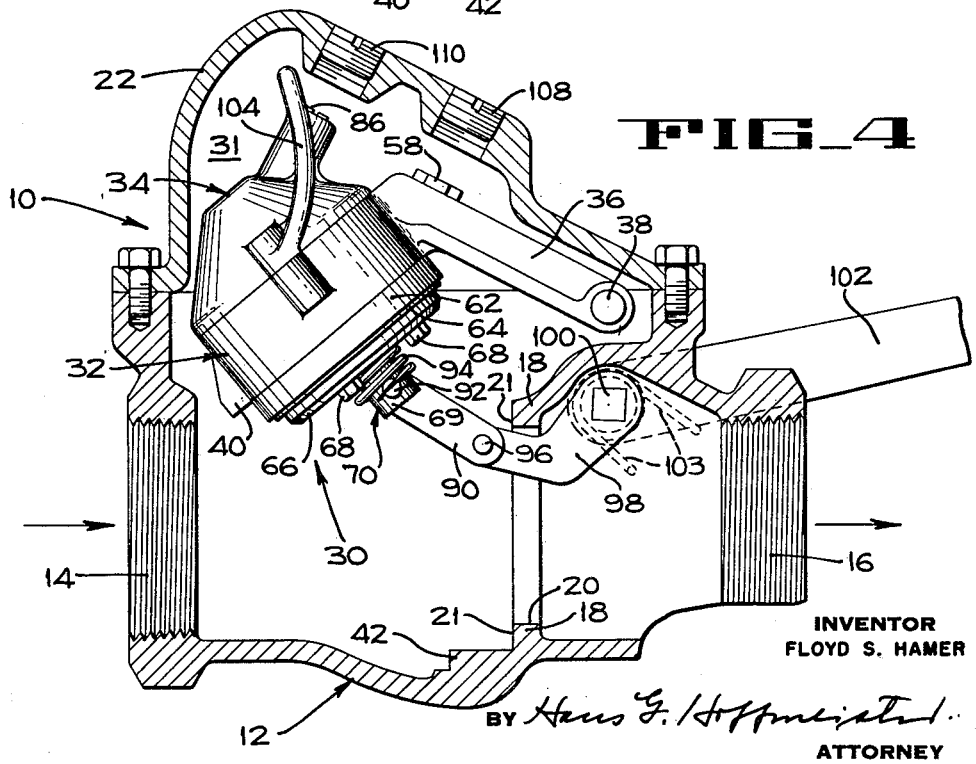

3,136,338
DASHPOT CONTROLLED LOADING VALVE
Floyd Stanford Hamer, Long Beach, Calif., assignor to FMC Corporation, a corporation of Delaware
Filed May 17, 1961, Ser. No. 110,769
16 Claims. (Cl. 137—630.14)

The present invention pertains to fluid valves, and more particularly relates to a lever actuated, self-closing valve.

An object of the present invention is to provide an improved valve of the type particularly adapted for use in apparatus for loading liquid into tank trucks.

Another object of the present invention is to provide an improved valve that can be quickly and easily operated and will not cause hydraulic shock, or "water hammer," as the result of closing.

Another object is to provide an improved self-closing valve that is adjustable to control its closing rate.

Another object of the present invention is to provide an improved valve into which an operating handle extends through the valve housing at a location not exposed to line pressure when the valve is closed.

Another object of the present invention is to provide a valve whose internal flow controlling parts can be inspected, adjusted, repaired, or replaced without removing the valve from the line.

Another object of the present invention is to provide a liquid loading valve having a substantially unrestricted flow passage therethrough when the valve is open.

These and other objects of the present invention will become apparent from the following description and the accompanying drawings, wherein:

FIG. 1 is an axial section through the valve of the present invention, showing the valve in its fully closed condition.

FIG. 2 is a view similar to FIG. 1, illustrating the initial phase of the opening of the valve.

FIG. 3 is another view similar to FIG. 1, illustrating another phase of the opening of the valve.

FIG. 4 illustrates the valve in its fully open position.

The valve 10 of the present invention comprises a housing 12 having an inlet port 14 and an outlet port 16. Intermediate the ports 14 and 16 is an internal web 18 which extends across the valve housing and is provided with a flow orifice 20 of substantially the same diameter as, and in axial alignment with, the ports 14 and 16. The direction of flow through the housing 12 is indicated by the flow arrows. The upstream face of the web 18, at least in the region immediately surrounding the orifice 20, is suitably surfaced to function as a valve seat 21.

An access opening provided in the top wall of the housing 12 is closed by an arched cover plate 22. A valve assembly 30 is mounted for swinging or pivotal movement within the housing 12 and cooperates with the main valve seat 21 to control fluid flow through the valve 10. The arching of the cover plate is of such a nature that it defines a chamber 31 which accommodates a considerable part of the valve assembly 30, as shown in FIG. 4. Because of this arrangement, the valve assembly 30 is completely removed from between the inlet and outlet ports when the valve is open, thus providing a substantially unrestricted flow passage through the open valve.

The valve assembly 30 comprises a dashpot having a hollow cylindrical portion 32 and a cover portion 34. An arm 36 fixed to the cylindrical portion 32 is pivotally mounted on a shaft 38 secured to the housing 12. A rib 40 projecting from the portion 32 opposite the arm 36 is adapted to abut a similar rib 42 within the housing 12 to limit movement of the dashpot toward the web 18.

A valve piston 50 of generally tubular form is provided with a head 52 which is slidable within the bore 53 of the cylindrical portion 32 of the dashpot. The inner edge of a radially inwardly projecting annular flange 54 on the inner, or bottom end of the cylindrical portion 32 of the dashpot slidably engages the piston 50. The flange 54 and the piston head 52 cooperate to define an annular compression chamber 56 beneath the piston head 52. A check valve assembly 58 is screwed into a suitable opening in a side of the cylindrical portion 32 of the dashpot in flow communication with the compression chamber 56. Liquid can flow freely through the check valve assembly 58 into the chamber 56, but outward flow from the chamber 56 can occur only through a restricted orifice 60 and, consequently, only at limited rate.

An annular backing plate 62, an annular valve 64 of resilient material, and a valve retaining ring 66 are fixed to the valve piston 50 by capscrews 68. The ring 66 is of small enough external diameter to enter the orifice 20 in the web 18. The valve element 64 is of larger diameter and is adapted to engage the main valve seat 21 on the upstream face of the web 18 to prevent flow through the orifice 20 when the valve assembly 30 is in its valve closing position.

The stem portion 69 of an auxiliary or pilot valve 70 extends through and is slidably mounted in the opening through the center of the ring 66 and is provided with an enlarged head portion 72 received within the tubular valve piston 50. The shoulder 74 between the enlarged head 72 and the smaller, shank portion 69 of the pilot valve, is adapted to engage the upstream face of the valve element 64 which functions as an auxiliary seat for the pilot valve 70 to prevent flow through the opening in the center of the valve element 64. The head portion 72 of the pilot valve 70 has a bore 76 therein, within which is slidably fitted a cylindrical projection 78 formed on the inside of the cover portion 34 of the dashpot assembly. A drilled passageway 80 in the cylindrical projection 78 connects the bore 76 of the head 72 of the pilot valve 70 with the interior of the dashpot assembly. A similar passage 82 connects the interior of the dashpot assembly with the interior of the valve housing 12 outside of the dashpot assembly. A screen 84 covers the outer end of the passageway 82 to prevent the entry of foreign particles. A needle valve 86 adjustably controls the rate of flow through the passageway 82 into the interior of the dashpot assembly.

As above stated, the stem 69 of the pilot valve 70 extends through the valve retaining plate 66. An operating link 90 is connected to the stem of the pilot valve 70 by a pivot pin 92. A compression spring 94 confined between the pin 92 and the valve retaining ring 66 urges the pilot valve 70 toward its seat on the upstream face of the valve element 64. A second pivot pin 96 connects the link 90 to an operating arm 98 fixed to a shaft 100 which extends through the wall of the housing 12 downstream from the web 18. An operating arm or handle 102 is fixed to the outer end of the operating shaft 100. A spring 103 encircling the shaft 100 outside the housing 12 constantly urges the shaft 100 to turn counterclockwise as viewed in the drawings.

A curved vane 104 is fixed to the outer surface of the cap portion 34 of the dashpot assembly and curves upward and rearward therefrom for purposes which will be explained hereinbelow.

In order to open the valve, the operating handle 102 is rotated clockwise as viewed in the drawings, from the position illustrated in FIG. 1 to the position illustrated in FIG. 4. The initial phase of the opening of the valve comprises movement of the pilot valve 70 to the position illustrated in FIG. 2, permitting fluid from within the dashpot assembly to flow outward through slots 106 formed in the retaining ring 66, as indicated by the flow arrows. The second phase of the valve opening is illustrated in FIG. 3 wherein the compression of spring 94 has caused the valve 64 to move to the left as viewed in FIG. 3. At the same time, the piston head 52 of the valve piston 50 is moved to the left, this action being made possible because the interior of the dashpot has been vented by the opening of the pilot valve in the initial phase. Fluid from outside the dashpot assembly flows through the check valve assembly 58 into the compression chamber 56. Further movement of the handle 102 causes the dashpot and valve assembly 30 to swing to a position within the arched portion 31 of cover plate 22 as illustrated in FIG. 4, thus providing a substantially unobstructed passageway through the valve assembly.

The valve 10 will close automatically at any time that the handle 102 is released, due to the torque exerted upon the shaft 100 by the spring 103. Closing action can be expedited, however, by manually turning the handle counterclockwise as viewed in the drawings. In either case, the curved vane 104 checks closing movement of the valve assembly 30 to prevent slamming of the abutment 40 against the stationary abutment 42, because as the valve assembly 30 enters the high velocity flow, impingement of the liquid against the inclined vane 104 effectively damps movement of the assembly 30 toward the web 18. After swinging of the cylindrical portion 32 and its cover 34 is arrested by engagement of the abutments 40 and 42, the spring 103 continues to pull the pilot valve 70 toward the valve element 64 and to pull the valve element 64 toward its seat 21. Closing movement of both valves 70 and 64 is damped, however, because entry of liquid into the bore 76 is restricted by the needle valve 86, and escape of liquid entrapped within the compression chamber 56 can occur only through the restricted orifice 60. The spring 94 exerts sufficient force against the pilot valve to prevent the partial vacuum created within the bore 76 from lifting the pilot valve off the valve element 64, even though the high velocity fluid flowing past the partly closed main valve element 64 may create the tendency for the main valve element 64 to pull away from the pilot valve. Therefore both valves 70 and 64 approach their respective seats at sufficiently retarded velocity to prevent their slamming; and thus is prevented the hydraulic shock in the valve 10 and in the system upstream from the valve which otherwise would occur.

The rate at which the valve 64 closes may be controlled either by varying the size of the orifice 60 or by changing the setting of the needle valve 86 or by both of these adjustments. It will be noted that the cover plate 22 is provided with two access openings closed by plugs 108 and 110, respectively, which are in alignment with the check valve 58 and the needle valve 86, respectively, when the valve is in its open position illustrated in FIG. 4. Thus, either or both of these adjustments may be made without removing the cover plate, but by removing the plug 108, the plug 110, or both, from the valve housing and inserting a suitable tool for making the adjustment.

While one embodiment of the present invention is described herein, it should be noted that various changes may be made therein without departing from the spirit of the invention as defined in the appended claims.

The invention having thus been described, what is believed to be new and desired to be protected by Letters Patent is:

1. A valve mechanism comprising a housing having inlet and outlet ports, a valve seat intermediate said ports, a valve assembly mounted for swinging movement toward and away from said seat, said valve assembly including a dashpot assembly, a piston slidably mounted in said dashpot assembly, a main valve carried by said piston and adapted to engage said valve seat, an auxiliary valve seat surrounding a port in said main valve, a pilot valve for venting said dashpot assembly slidably mounted within said dashpot assembly in position to engage said auxiliary valve seat, a compression chamber in said dashpot assembly downstream of said piston, check valve means for permitting flow into said compression chamber, restricted orifice means for controlling flow of fluid from said compression chamber, and operating means pivotally connected to said pilot valve.

2. A valve mechanism comprising a housing having inlet and outlet ports, a valve seat intermediate said ports, a valve assembly mounted for swinging movement toward and away from said seat, said valve assembly including a dashpot assembly, a piston slidably mounted in said dashpot assembly, a main valve carried by said piston and adapted to establish sealing engagement with said valve seat, an auxiliary valve seat surrounding a port in said main valve, a pilot valve for venting said dashpot assembly slidably mounted within said dashpot assembly and adapted to establish sealing engagement with said auxiliary valve seat, adjustable means for controlling the flow of line pressure into said dashpot assembly upstream of said piston, a compression chamber in said dashpot assembly downstream of said piston, check valve means for conducting flow into said compression chamber and restricting flow from said compression chamber, and operating means pivotally connected to said pilot valve.

3. A valve mechanism comprising a housing having inlet and outlet ports, a valve seat intermediate said ports, a valve assembly mounted for swinging movement toward and away from said seat, said valve assembly including a dashpot assembly, a piston slidably mounted in said dashpot assembly, a main valve carried by said piston and adapted to engage said valve seat, an auxiliary valve seat surrounding a port in said main valve, a pilot valve for venting said dashpot slidably mounted within said dashpot assembly and adapted to engage said auxiliary valve seat, spring means for urging said pilot valve into engagement with said auxiliary valve seat, adjustable means for controlling the flow of line pressure into said dashpot assembly upstream of said piston, a compression chamber in said dashpot assembly downstream of said piston, check valve means for permitting flow into said compression chamber, restricted orifice means for controlling flow from said compression chamber, and operating means pivotally connected to said pilot valve.

4. A valve mechanism comprising a housing having axially aligned inlet and outlet ports, a valve seat intermediate said ports, a valve assembly mounted for swinging movement toward and away from said seat, said valve assembly including a dashpot assembly, a piston slidably mounted in said dashpot assembly, a main valve carried by said piston and adapted to abut and seat against said valve seat, an auxiliary valve seat surrounding a port in said main valve, a pilot valve for venting said dashpot assembly slidably mounted within said dashpot assembly and adapted to abut and seat against said auxiliary valve seat, spring means for urging said pilot valve into contact with said auxiliary valve seat, adjustable means for controlling flow into said dashpot assembly upstream of said piston, a compression chamber in said dashpot assembly downstream of said piston, check valve means for permitting flow into said compression chamber, restricted orifice means for controlling flow from said compression chamber, and operating means pivotally connected to said pilot valve.

5. A valve mechanism comprising a housing having axially aligned inlet and outlet ports, a valve seat intermediate said ports, a valve assembly mounted for swinging movement toward and away from said seat, said valve assembly including a dashpot assembly, a piston slidably mounted in said dashpot assembly, a main valve carried by said piston and adapted to abut and seat against said valve seat, an auxiliary valve seat surrounding a port in said main valve, a pilot valve for venting said dashpot assembly slidably mounted within said dashpot assembly and adapted to abut and seat against said auxiliary valve seat, spring means urging said pilot valve into contact with said auxiliary valve seat, adjustable means for controlling flow into said dashpot assembly upstream of said piston, a compression chamber in said dashpot assembly downstream of said piston, check valve means for permitting flow into said compression chamber, restricted orifice means for controlling flow from said compression chamber, an operating shaft rotatably mounted in and projecting through said housing downstream from said valve seat, an operating arm fixed to said shaft, a link pivotally connected at one of its ends to said arm and at its other end to the stem of said pilot valve, and means outside said housing for rotating said shaft.

6. A valve mechanism comprising a housing having a flow passage therethrough and an annular valve seat encircling the flow passage, a valve assembly mounted within the housing for movement toward and away from said annular seat, said valve assembly having a chamber therewithin, piston means including a head portion reciprocable within the chamber with the periphery of the head portion in fluid sealing engagement with the circumferential wall of the chamber and a shank portion projecting through an end wall of the chamber in sliding, fluid sealing relation therewith to seal the part of said chamber between said head portion and said end wall, the shank portion of said piston means having a longitudinal bore therethrough, an annular valve carried by said shank portion and engageable with said annular seat to control flow through said flow passage, check valve means for permitting flow into said part of the chamber to accommodate movement of the piston and annular valve relative to the valve assembly and away from said annular seat, orifice means for permitting restricted flow from said part of the chamber to retard movement of the piston and said annular valve relative to the valve assembly and toward said annular seat, a pilot valve reciprocably mounted within said longitudinal bore of the piston means and engageable with said annular valve to close the central aperture of the annular valve, means independent of said check valve means for restricting the rate of movement of said pilot valve toward the annular valve, and operating means for moving the pilot valve off said annular valve and the valve assembly away from the annular seat.

7. A valve mechanism comprising a housing having a flow passage therethrough and an annular valve seat encircling the flow passage, a valve assembly mounted within the housing for movement toward and away from said annular seat, abutment means carried by the housing for limiting movement of the valve assembly toward said annular seat, said valve assembly defining a chamber therewithin, piston means including a head portion reciprocable within the chamber and a shank portion projecting through an end wall of the chamber and having a longitudinal bore therethrough, the part of said chamber between said head portion and said end wall being sealed to form a compression chamber on the downstream side of the piston means, an annular valve carried by said shank portion and being engageable with said annular seat to control flow through said flow passage, check valve means for permitting flow into said compression chamber, orifice means for permitting restricted flow from said compresssion chamber, a pilot valve reciprocable within said longitudinal bore of the piston means and engageable with said annular valve to close the central aperture thereof, means independent of said check valve for restricting the rate of movement of said pilot valve toward said annular valve, and operating means for moving the pilot valve from the annular valve, the annular valve off said annular valve seat and the valve assembly away from the annular seat.

8. A valve mechanism comprising a housing having a flow passage therethrough and an annular valve seat encircling the flow passage, a valve assembly mounted within the housing, said valve assembly defining a chamber therewithin, piston means including a head portion reciprocable within the chamber and a shank portion projecting through an end wall of the chamber and having a longitudinal bore therethrough, the part of said chamber between said head portion and said end wall being sealed to form a compression chamber on the downstream side of said piston means, an annular valve carried by said projecting portion of the piston means and being engageable with said annular seat to control flow through said flow passage, check valve means for permitting flow into said compression chamber, orifice means for permitting restricted flow from said compression chamber, a pilot valve reciprocable within said longitudinal bore and projecting therethrough to engage said annular valve so as to seal the central aperture thereof, operating means connected to said pilot valve for moving the pilot valve away from said annular valve to open said central aperture thereof and thereby initiate restricted flow through said annular seat, and abutment means carried by said valve assembly engageable by said pilot valve after opening of said central aperture of the annular valve whereby continued movement of the pilot valve effects removal of the annular valve from said annular seat to permit substantially unrestricted flow through said flow passage.

9. A valve mechanism comprising a housing having a flow passage therethrough and a valve seat encircling the flow passage, a valve assembly mounted within the housing for movement toward and away from said seat, said valve assembly defining a chamber therewithin, piston means including a head portion reciprocable within the chamber with the periphery of the head portion in fluid sealing engagement with the circumferential wall of the chamber and a shank portion projecting toward said valve seat and through an end wall of the chamber in sliding, fluid sealing relation therewith to seal the part of said chamber between said head portion and said end wall, valve means carried by said shank portion engageable with said valve seat to control flow through said flow passage, check valve means for permitting flow into said part of the chamber, orifice means for permitting restricted flow from said part of the chamber, and operating means for moving the valve off said seat and the said valve assembly away from the seat.

10. In a valve including a main housing provided with axially aligned inlet and outlet ports interconnected by a passageway, a chamber laterally offset from said passageway, and a stationary main valve seat circumscribing said passageway; a valve assembly including a dashpot having a cylinder portion mounted in said main housing for movement between a first position in said chamber and a second position between said inlet port and valve seat, said cylinder portion and main valve seat being of generally the same diameter, said dashpot also having a mounting portion coaxial with said main valve seat in said second position, a piston fitted in said cylinder portion for reciprocation therein, means for admitting fluid from said housing into said cylinder portion, an annular main valve element mounted on said piston for reciprocation therewith into and out of engagement with said main seat when said cylinder portion is in said second position, said main valve element being provided with a secondary valve seat surrounding a port in said main element, a pilot valve including a pilot mounting portion extended through said piston and telescopically interfitted with the mounting portion of the dashpot and a pilot valve element on said pilot mounting portion being movable into and out of engagement with said secondary valve seat, there being a fluid path from within said cylinder portion to said secondary valve seat, and means yieldably urging said pilot valve element against said secondary seat; and operating means for successively moving said pilot valve element out of engagement with said secondary seat thereby allowing fluid to escape from said cylinder portion by way of said path through said port in the secondary valve seat and for thence moving said cylinder portion into its first position, said operating means being also effective to move said cylinder portion into its second position and said valve elements against their respective seats.

11. The valve of claim 10 wherein said pilot valve also has a shank projecting from said pilot valve element through said secondary valve seat, wherein said cylinder portion is movable on an arc between said positions, and wherein said operating means is connected to said shank and imposes valve opening force thereagainst substantially axially of said shank from said second position to said first position.

12. The valve of claim 10 wherein said pilot valve also has a shank projecting from said pilot valve element through said secondary valve seat, wherein said operating means is connected to said shank, and wherein said dashpot and pilot valve have confronting abutment means that engage, following movement of the pilot valve element out of seat engagement, for enabling said opreating means to move said valve assembly into its first position.

13. The valve of claim 10 wherein said housing and cylinder portions have abutments that engage each other in said second position of the cylinder portion for limiting movement of said cylinder portion and coaxially aligning said cylinder portion and main valve seat.

14. In a valve including a main housing provided with axially aligned inlet and outlet ports interconnected by a passageway, a chamber laterally offset from said passageway, and a stationary main valve seat circumscribing said passageway; a valve assembly including a dashpot having a cylinder portion mounted in said main housing for movement on an arcuate path between a first position in said chamber and a second position between said inlet port and valve seat, a piston fitted in said cylinder portion for reciprocation therein, means for admitting fluid from said housing into said cylinder portion, an annular main valve element mounted on said piston for reciprocation therewith into and out of engagement with said main seat when said cylinder portion is in said second position, said main valve element being provided with a secondary valve seat surrounding a port in the main element, a pilot valve including a pilot valve element mounted on said dashpot for movement into and out of engagement with said secondary valve seat, said pilot valve also having a shank projecting from said pilot valve element through said secondary valve seat, there being a fluid path from within said cylinder portion of the dashpot to said secondary valve seat; and operating linkage means pivotally mounted in said housing, positioned between said main seat and said outlet port, and being connected to said shank for imposing valve opening force generally axially of the shank from said second position to said first position.

15. In a valve including a main housing provided with axially aligned inlet and outlet ports interconnected by a passageway, a chamber laterally offset from said passageway, and a main valve seat circumscribing said passageway; a valve assembly including a dashpot having a cylinder portion mounted in said main housing for movement between a first position in said chamber and a second position between said inlet port and said valve seat and a cover portion projecting from said cylinder portion toward said inlet port and having a generally hemispherical surface facing said inlet port in said second position, a piston fitted in said cylinder portion for reciprocation therein, means for admitting fluid from said housing into said cylinder portion, an annular main valve element mounted on said piston for reciprocation therewith into and out of engagement with said main seat when said cylinder portion is in said second position, said main element being provided with a secondary valve seat surrounding a port in said main element, a pilot valve including a pilot valve element mounted on said dashpot for movement into and out of engagement with said secondary valve seat, there being a fluid path from within said cylinder portion to said secondary valve seat; and operating means for successively moving said pilot valve element out of engagement with said secondary seat thereby allowing fluid to escape from said cylinder portion by way of said path through said port in the secondary valve seat and for thence moving said cylinder portion into its first position, said operating means being also effective to move said cylinder portion into its second position and said valve elements against their respective seats.

16. In a valve including a main housing provided with axially aligned inlet and outlet ports interconnected by a passageway, a chamber laterally offset from said passageway, and a main valve seat circumscribing said passageway; a valve assembly including a dashpot having a cylinder portion mounted in said main housing for movement on an arcuate path between a first position in said chamber and a second position between said inlet port and valve seat, a piston fitted in said cylinder portion for reciprocation therein, means for admitting fluid from said housing into said cylinder portion, an annular main valve element mounted on said piston for reciprocation therewith into and out of engagement with said main seat when said cylinder portion is in said second position, said main element being provided with a secondary valve seat surrounding a port in said main element, a pilot valve including a pilot valve element mounted on said dashpot for movement into and out of engagement with said secondary valve seat, there being a fluid path from within said cylindar portion to said secondary valve seat, a vane, and means mounting the vane on the cylinder portion in oblique relation to the axis of said main valve seat with the vane projecting from said axis in the general direction of said chamber when said cylinder portion is in its second position, so that fluid pressure from said inlet port bears against said vane and retards movement of the cylinder portion from said first position to said second position; and means for successively moving said pilot valve element out of engagement with said secondary seat and for thence moving said cylinder portion into its first position, said operating means being also effective to move said cylinder portion to its second position and said valve elements against their respective seats.

References Cited in the file of this patent

UNITED STATES PATENTS

| | | |
|---|---|---|
| 2,406,727 | Wetherbee | Aug. 27, 1946 |
| 2,672,888 | Shields | Mar. 23, 1954 |
| 2,955,797 | Billeter | Oct. 11, 1960 |
| 2,966,167 | Jensen | Dec. 27, 1960 |

FOREIGN PATENTS

| | | |
|---|---|---|
| 92,781 | Switzerland | Mar. 2, 1920 |